United States Patent [19]
Natschke et al.

[11] Patent Number: 6,086,053
[45] Date of Patent: Jul. 11, 2000

[54] FAN GUARD MOUNTED MISTER HAVING PLURALITY OF SPACED NOZZLES

[75] Inventors: Craig A. Natschke; Jesse W. Walsh, both of Jackson, Mich.

[73] Assignee: Airmaster Fan Company, Jackson, Mich.

[21] Appl. No.: 09/136,581

[22] Filed: Aug. 19, 1998

[51] Int. Cl.[7] .................................. B01F 3/04; B01F 5/18
[52] U.S. Cl. .............................. 261/30; 261/84; 261/116; 261/DIG. 43; 239/222.1; 239/289
[58] Field of Search .................................. 261/30, 84, 88, 261/89, 90, 116, DIG. 3, DIG. 43, DIG. 65, 28; 422/124; 239/380, 222.11, 289

[56] References Cited

U.S. PATENT DOCUMENTS

| | | | |
|---|---|---|---|
| 1,066,851 | 7/1913 | Siefert | 261/30 |
| 1,357,535 | 11/1920 | Ohite | 261/30 |
| 1,498,355 | 6/1924 | Cox | 261/88 |
| 1,586,997 | 6/1926 | Hull | 261/88 |
| 1,911,871 | 5/1933 | Anderson | 261/30 |
| 1,993,635 | 3/1935 | Towt . | |
| 2,079,117 | 5/1937 | Hays | 261/90 |
| 2,238,120 | 4/1941 | Launder | 261/30 |
| 3,135,466 | 6/1964 | Reid . | |
| 3,595,536 | 7/1971 | Ripley . | |
| 3,997,115 | 12/1976 | Licudine . | |
| 4,261,930 | 4/1981 | Walker . | |
| 4,443,387 | 4/1984 | Gordon . | |
| 5,338,495 | 8/1994 | Steiner et al. . | |

FOREIGN PATENT DOCUMENTS

| 10368 | 11/1927 | Australia | 261/88 |
|---|---|---|---|

*Primary Examiner*—David A. Simmons
*Assistant Examiner*—Robert A. Hopkins
*Attorney, Agent, or Firm*—Young & Basile, P.C.

[57] ABSTRACT

A mister for use with fans having blades protected by a guard wherein the mister is mounted on the guard and through a plurality of water atomizing nozzles projects a mist into the fan airflow to produce a cooling effect by the evaporation of the moist air. The mister may be used with original equipment fans, or may be retrofitted to existing guarded fans and economically produces a distribution of water particles within the airflow.

4 Claims, 2 Drawing Sheets

FAN GUARD MOUNTED MISTER HAVING PLURALITY OF SPACED NOZZLES

BACKGROUND OF THE INVENTION 1.3 Field of the Invention

The invention pertains to the producing of a water mist for evaporation cooling purposes, the mist producing apparatus being mountable upon a fan blade guard.

2. Description of the Related Art

The cooling effect provided by the evaporation of a water mist or small particles of airborne water has been used to cool humans and animals for many years, and water mist has been used to maintain moisture on fresh produce. In recent years, water misters have been used in conjunction with fans or air blowers to specifically direct water bearing airflows toward the area to be cooled, and such devices are widely used to cool patios, decks and large open areas occupied by humans, and misters are also employed at athletic events to provide a cooling environment for the participants.

Misting devices used in conjunction with fans are shown in U.S. Pat. Nos. 1,993,635; 3,997,115 and 4,443,387.

Misting devices of the prior art are expensive to manufacture and require custom fabrication and machining, employing specially made shafts for the fan and misters readily retrofittable to existing fans are not available and present mister devices are relatively expensive and often require complex installation.

OBJECTS OF THE INVENTION

It is an object of the invention to provide a mister for use with fans having blades guarded by grills wherein the mister is mounted upon the center of the front guard grill and uniformly disperses a fine mist within the airflow produced by the rotating fan blades.

Another object of the invention is to provide a mister for bladed fans having guard grills wherein the mister is easily mounted upon the guard grill, and may be retrofitted to existing fans of this type.

An additional object of the invention is to provide an inexpensive mister for fans which may be easily attached to a fan guard grill and dispenses atomized water through a plurality of nozzles to evenly distribute the water droplets within the fan airflow.

SUMMARY OF THE INVENTION

A mister using the inventive concepts is particularly suitable for use with a relatively large electric fan having rotating blades, the blades usually having a radius of at least twelve inches. The blades are shielded by a guard grill, usually formed of welded wire, wherein air may readily flow through the grill, but the grill openings are small enough to prevent fingers from encountering the blades. Usually, the guard grill consists of a rear portion disposed between the blades and the rear mounted motor housing, and a front portion affixed at its periphery to the periphery of the rear guard grill portion.

The mister consists of a circular body having a rear surface intersected by threaded holes whereby bolts or screws extending through the front guard grill portion may affix the mister body to the front guard grill. Usually, the mister body is mounted upon the front guard grill coaxial to the axis of rotation of the fan blades.

The mister body includes a plurality of passages defined therein which intersect the front surface of the body. Preferably, the body front surface constitutes a segment of a cone annularly and angularly oriented to the axis of the body wherein the passages perpendicularly intersect the front surface and are evenly spaced about the peripheral configuration of the front surface.

The outer ends of the passages intersecting the body front surface are internally threaded wherein a threaded water atomizing nozzle may be located in the outer end of each passage adjacent the body front surface. Due to the conical configuration of the front surface, the evenly spaced nozzles are directed away from the axis of the body, and the axis of fan rotation, to disperse the misted water particles outwardly from the fan blade axis to evenly distribute water particles throughout the width of the airflow produced by the fan blades.

Passages defined in the mister body intersect within the body wherein the intersection and the passages themselves constitute a manifold chamber, and this manifold chamber also communicates with a pressurized water source. This communication of the manifold with a water source is through a passage defined in the body having a fitting adjacent the body receiving a water supply hose. This hose is supplied from a valve in turn connected to a water supply source, such as a flexible garden-type hose, and operation of the valve controls the amount of water supplied to the mister controlling the water flow therethrough.

By the use of a multiplicity of passages and nozzles associated with the mister body, an excellent distribution of water particles within the fan airflow is achieved, and the mister body construction may be economically produced, while the mode of attaching the body to the front fan guard grill readily permits the mister to be affixed to original equipment, or retrofitted to existing fans.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
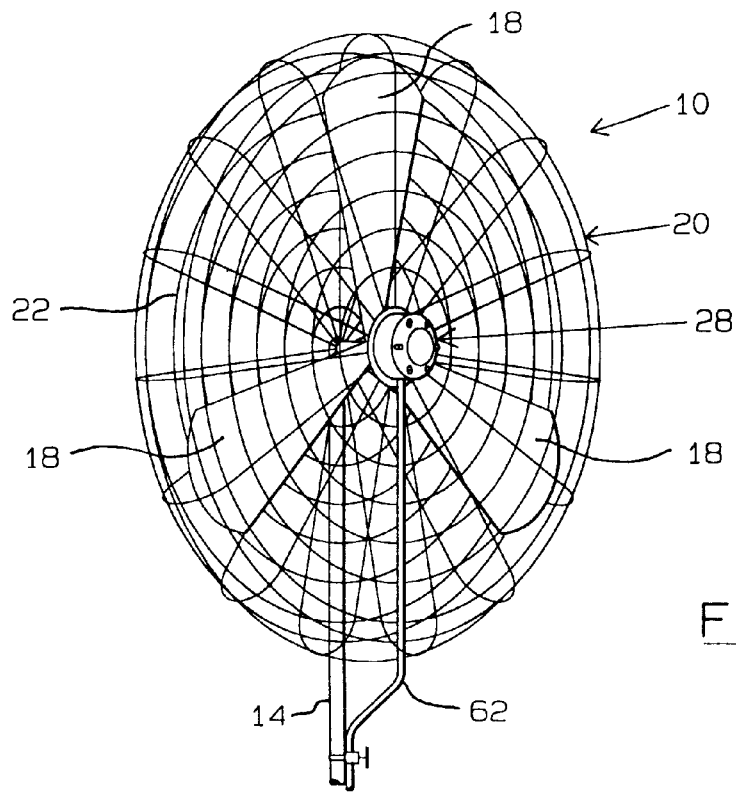
FIG. 1 is a perspective front view of an electric fan having a mister mounted on the front guard grill thereof in accord with the inventive concepts.
Figure 2:
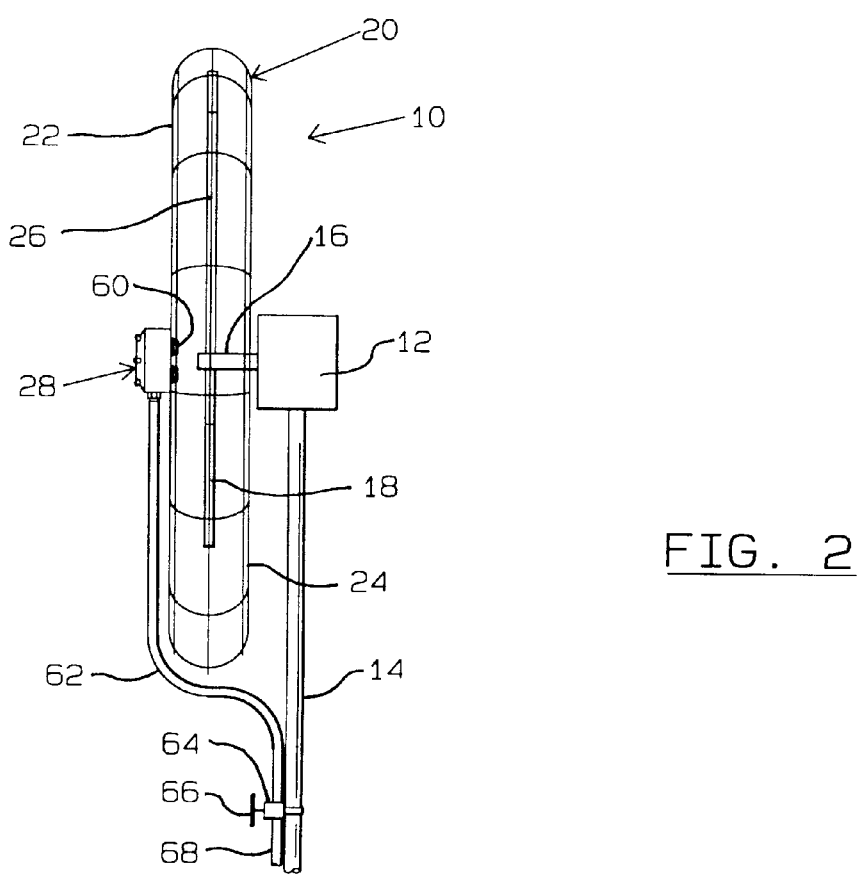
FIG. 2 is a side elevational view of FIG. 1 as taken from the right side thereof.

With reference to FIGS. 1 and 2, a typical large commercial type electric fan generally indicated at 10 is illustrated having an electric motor 12 mounted upon the upper end of a pedestal 14 supported upon a base, not shown. The motor 12 includes a shaft 16 upon which the fan blades 18, three in the disclosed embodiment, are mounted. In the typical manner, the blades 18 are enshrouded within a protective guard grill 20 consisting of a front grill portion 22 and a rear grill portion 24. The grill portions 22 and 24 are formed of welded wire circles and radial elements in the known manner, and the grill portions are interconnected at a peripheral joining line 26, FIG. 2, which may include a hinge for providing access to the blades.

In the drawings, the mister is illustrated at 28 and includes a body 30 which may be formed of metal, or could be molded of a synthetic plastic material. The body 30 includes a rear support surface 32 and a front surface 34 which, as will be apparent in FIG. 4, consists of a conical segment. The outermost portion of the body is defined by the front end surface 36 which is parallel to the rear support surface 32.

Interiorly, a plurality of passages, six in the enclosed embodiment, are indicated at 38. Each passage 38 includes an inner end 40 wherein all of the inner ends of the passages 38 converge and communicate with each other as appreciated in FIGS. 3 and 4. The passage outer ends 42 each perpendicularly intersect the front surface 34, FIG. 4, and the passage outer ends 42 are each threaded at 44.

Figure 4:
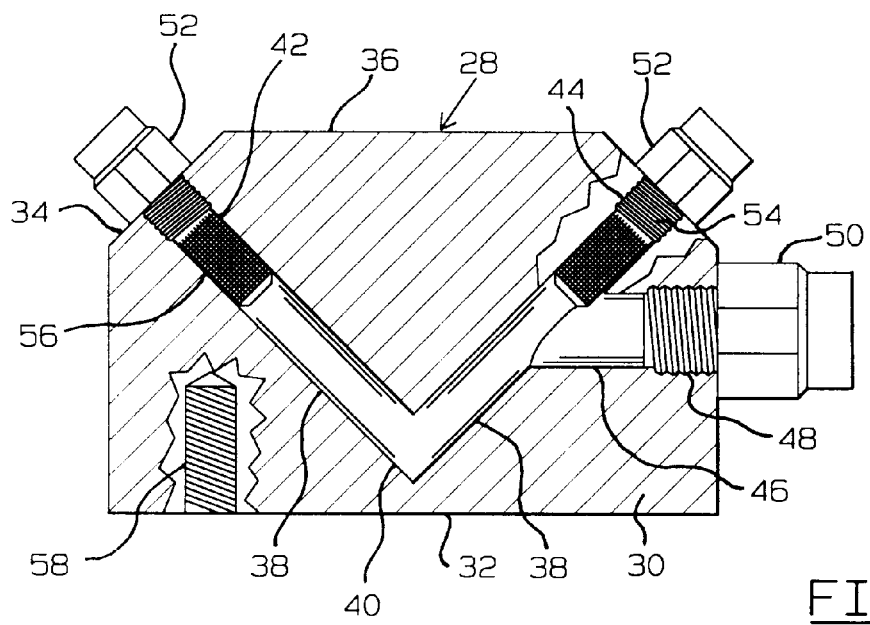
FIG. 4 is an elevational sectional, partially broken, view of the mister body as taken through Section 4—4 of FIG. 3, a portion of the mister body being broken to illustrate the threaded fastener receiving holes.

A water supply passage 46, FIG. 4, is defined within the body 30 and communicates with all of the passages 38 wherein the passages 38 and the passage 46 constitute a manifold. The outer end of the passage 46 is threaded at 48 for receiving the hose fitting 50.

Figure 3:
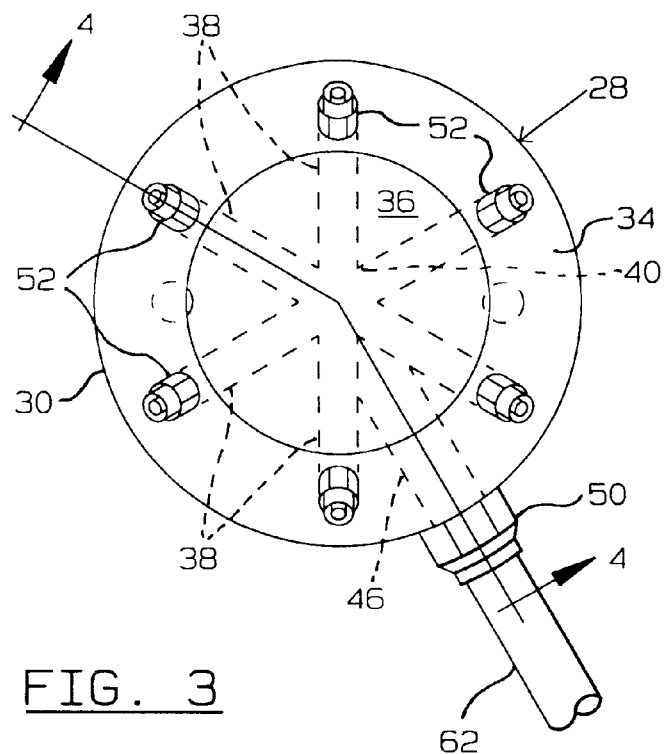
FIG. 3 is an elevational view of the mister body and attached water supply, per se, the fan structure not being shown.

A water atomizing nozzle 52 having threads 54 formed thereon is received within the passage threads 44, FIG. 4, wherein the nozzles 52 each communicate with a passage 38 and are located adjacent the front surface 34 perpendicularly extending therefrom and equally spaced, circumferentially, about the front surface 34 as will appreciated in FIG. 3. Each of the nozzles 52 includes a filter screen 56 located within the associated passage 34 to screen out foreign matter.

The mister 28 is mounted upon the blade protective grill 20, the front grill 22 specifically, and such mounting includes two threaded fastener receiving bores 58, FIG. 4, which receive bolts or screws 60, FIG. 2, extending through holes defined upon a mounting plate, or washers, located upon the inside of the front grill 22, FIG. 2. Preferably, the axis of the mister body 30 is coincident with the axis of rotation of the fan shaft 16.

A flexible hose 62 is affixed to the fitting 50 and receives water from the valve 64, FIG. 2, attached to the pedestal 14. The valve 64 includes a control handle 66 whereby the amount of water flowing through the valve 64 can be closely regulated. The valve 64 receives water from a hose 68, such as a garden hose or the like, attached to a pressurized water source.

In operation, the mister body 30 is mounted coaxially upon the guard grill 20 as illustrated in FIGS. 1 and 2, and the motor 12 is energized to cause air to flow through the guard grill 20 from the right to the left, FIG. 2, as produced by the rotation of the blades 18. The operator then adjusts the valve handle 66 to regulate the amount of water flowing into the mister body 30 through the water supply passage 46. As the passages 38 are thereby filled with water and the water forced through the nozzles 52, the spray pattern produced by the nozzles 52 is evenly projected throughout the airflow through the guard grill 20 wherein the entire airflow through the grill 20 will be receiving water particles which will travel with the air movement to provide the desired evaporative cooling.

The mister body 30 may be easily mounted upon either new or existing fans 10 by means of the threaded bores 58 and the bolts 60, and as will be appreciated from the description and drawings, the cost of manufacture of the mister is relatively low. No extensive modifications to the fan 10 are required and the mister body 30 may be mounted upon the fan 10, or removed therefrom, without damage or modification to the fan. The even distribution of the nozzles 52 about the front surface 34 provides an even distribution of water particles within the fan airflow without creating "wet" or "dry" spots within the airflow.

It is appreciated that various modifications to the inventive concepts may be apparent to those skilled in the art without departing from the spirit and scope of the invention.

What is claimed is:

1. A mister for fans having electric motor driven blades rotating about an axis protected by a guard grill having front and rear portions enclosing the blades comprising, in combination, a compact, concise, solid body having an axis, a rear support surface and a front surface having an axis, fastening means defined on said body for attaching said body rear support surface to the fan guard grill front portion concentric to the blade axis, a plurality of mister passages defined in said body in communication with each other and together forming a manifold, each mister passage having an outer end intersecting said body front surface, a pressurized water supply passage defined in said body in communication with said manifold having an inlet fitting located exteriorly of said body, and a water atomizing nozzle located in each said mister passage outer end extending from said body front surface, said body being of a circular configuration, the axes of said body and said body front surface being coincident, said body front surface defining a partial cone wherein said nozzles each diverge away from said front surface axis and said nozzles being equally spaced on said conical front surface about said front surface axis.

2. A mister for fans as in claim 1, threads defined within said mister passages' outer ends, said nozzles being exteriorly threaded and engaging said mister passages' threads.

3. In a combination as in claim 1, said fastening means comprising fastener receiving means defined on said rear support surface, and fasteners received within said fastener receiving means fixing said mister body to said guard grill front portion.

4. In a combination as in claim 3 wherein said fastener receiving means defined on said body comprise threaded holes and said fasteners comprise threaded bolts.

* * * * *